United States Patent
Bonta

[19]
[11] Patent Number: 6,014,565
[45] Date of Patent: Jan. 11, 2000

[54] METHOD FOR SERVICE PLANNING IN A RADIO TELEPHONE SYSTEM

[75] Inventor: Jeffrey D. Bonta, Arlington Heights, Ill.

[73] Assignee: Motorola, Inc., Schaumburg, Ill.

[21] Appl. No.: 09/086,944

[22] Filed: May 29, 1998

[51] Int. Cl.[7] .................................................. H04Q 7/20
[52] U.S. Cl. ........................ 455/437; 455/440; 455/446; 455/456
[58] Field of Search ................................ 455/436, 437, 455/440, 441, 444, 456, 525, 524, 446; 370/331, 332

[56] References Cited

U.S. PATENT DOCUMENTS

| | | | |
|---|---|---|---|
| 5,327,575 | 7/1994 | Menich et al. | 455/440 |
| 5,390,339 | 2/1995 | Bruckert et al. | 455/440 |
| 5,722,072 | 2/1998 | Crichton et al. | 455/437 |
| 5,835,849 | 11/1998 | Duque-Anton et al. | 455/444 |
| 5,884,176 | 3/1999 | Vaara | 455/444 |

FOREIGN PATENT DOCUMENTS 2 284 321  5/1995  United Kingdom.

*Primary Examiner*—Nguyen Vo
*Attorney, Agent, or Firm*—Sayed Hossain Beladi

[57] ABSTRACT

In a wireless communication system, including a first fixed communication unit (105), a plurality of other fixed communication units (101, 106), and a mobile communication unit (103) responsive to at least the first fixed communication unit, a radio telephone service planning method for generating a handover neighbor list. The method includes determining a route of travel of the mobile communication unit (103) relative to the first fixed communication unit (105). The method also includes establishing a plurality of connections between the mobile communication unit (103) and the plurality of other fixed communication units, based on the route of travel of the mobile communication unit, and then determining a corresponding plurality of signal quality metrics for the plurality of connections. The method further includes generating a handover neighbor list based on the corresponding signal quality metrics.

11 Claims, 4 Drawing Sheets

METHOD FOR SERVICE PLANNING IN A RADIO TELEPHONE SYSTEM

FIELD OF THE INVENTION

The present invention relates generally to radiotelephone systems and, more particularly, to a method for service planning via generating a neighbor list from simulations for a wireless communication system.

BACKGROUND OF THE INVENTION

In a radiotelephone communication system, a communication link via an RF channel is established between a mobile station, or subscriber unit, and a source base station. As a mobile station moves out of range of the source base station, the signal quality will degrade until the communication link would ultimately be broken, or the call "dropped". To avoid loss of the communication link resulting from a dropped call, the communication link is shifted from the source base station to a target base station. This process of making the shift is commonly referred to in the radiotelephone communication area, or cellular communication area as a handover process.

A handover can be defined as a change of channel during a call, either because of degradation of the quality of the RF channel which includes, power level or communication link quality below a certain threshold, or because of the availability of another channel which can allow communication at a lower transmit power, or to prevent a mobile station from grossly exceeding the planned base station boundaries. A handover may occur during a call in progress (e.g. from a traffic channel to a traffic channel), or during the initial signaling during call set-up. The handover may be either from a channel on the source base site to another channel on a target base site or between channels on the source base site.

In digital radiotelephone systems—such as time division multiple access (TDMA) and code division multiple access (CDMA) systems, a mobile assisted handoff (MAHO) process is utilized. In MAHO, the mobile station is provided with a neighbor list of candidate base stations available for handover of the mobile unit communication signal from a source base site to a target base site. At intermittent times, the mobile unit will measure a signal quality parameter of transmissions from the neighboring base stations. The signal quality parameter may be signal strength, or another appropriate parameter such as energy per chip per total noise (EC/Io), bit error rate (BER), frame erasure rate (FER), or color code. These measurements are gathered to determine a preferred list of target base transceiver stations to which handover may be directed.

Despite handover capability, a communication link failure followed by a dropped call, may happen when the signal-to-noise (S/N) level drops quickly in either a link from the mobile unit to the base station, or vice versa, resulting in the mobile communication unit's inability to detect handover commands. In order to maximize mobile unit handover performance, system parameters such as handover neighbor lists, handover thresholds, and access criteria are manually tuned. This process, which requires significant time and manpower, is commonly referred to as system optimization.

For example, compilation of handover neighbor list associated with each base transceiver station, or base site, begins with a manual process of selecting neighboring base sites which may be appropriate. Next, upon initial system deployment, maintenance personnel must drive test the typical mobile communication unit travel routes of the entire system, in order to determine whether or not the optimal neighboring base sites were selected for each handover neighbor list. Unfortunately, the manual process of drive testing does not consider dynamic signal-to-noise (S/N) conditions which are impacted by frequency planning, traffic loads, and base station coverage changes. In addition, this manual tuning process and drive testing must be repeated each time frequency planning and/or replanning of base station coverage areas is introduced. Further, if inappropriate neighboring base sites are selected for handover neighbor lists, an increase in dropped calls results, thereby degrading overall system performance and adversely impacting customer service.

Moreover, methods to select appropriate neighboring base sites for handover neighbor lists that are, for example, based on a proximity of target base stations to a particular source base station, also fail to provide optimal handover neighbor lists. While somewhat effective, this process does not restrict the locations being considered as handover locations nor does it validate the coverage of a candidate target base station to meet a predefined signal quality.

Therefore, a need exists for an improved method for generating handover neighbor lists in a radiotelephone communication system, which overcomes prior art problems.

DETAILED DESCRIPTION OF THE PREFERRED EMBODIMENT

Generally speaking, the foregoing need is addressed by a radio telephone service planning method for generating a handover neighbor list, which operates in a radiotelephone communication system including, including a first fixed communication unit, a plurality of other fixed communication units, and a mobile communication unit responsive to at least the first fixed communication unit. The method includes determining a route of travel of the mobile communication unit relative to the first fixed communication unit, via the use of a grid pattern and vector pattern with associated area coordinates. The method also includes establishing a plurality of connections made via a mobile communication signal originated between the mobile communication unit and the first fixed communication unit as well as the plurality of other fixed communication units. Determination of where the plurality of connections are made is based on the route of travel of the mobile communication unit, as expressed by the vector pattern. The method further includes determining a corresponding plurality of signal quality metrics for the plurality of connections and then generating a handover neighbor list based on the corresponding signal quality metrics. A corresponding apparatus for radio telephone service planning is also included.

Figure 1:
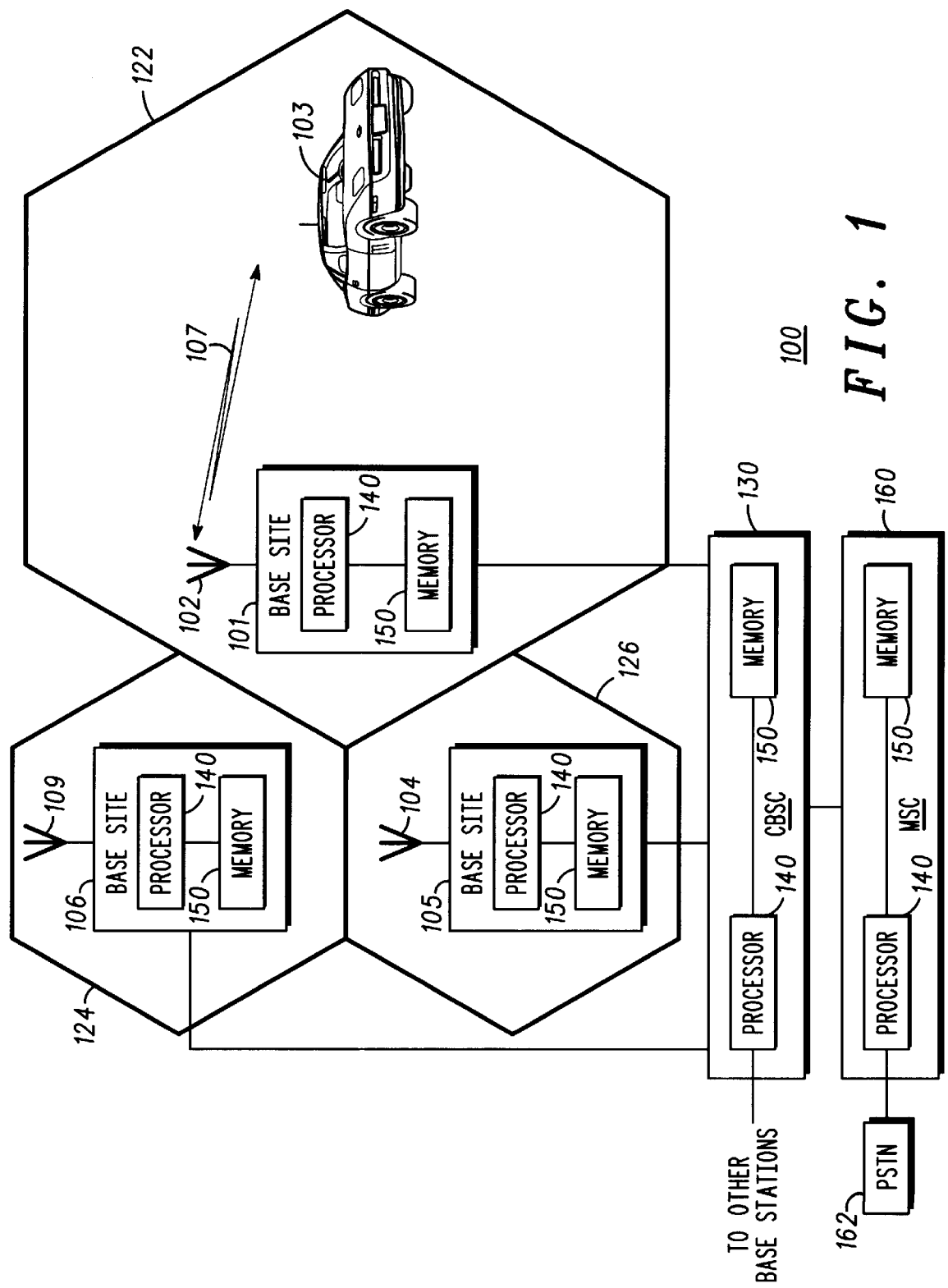
FIG. 1 is a diagram of a typical radiotelephone communication system.

Turning now to the drawings, wherein like numerals designate like components, FIG. 1 illustrates a radiotelephone communication system 100, such as a code division multiple access (CDMA) digital radiotelephone system set forth in the Telecommunications Industry Association Interim Standard 95A (TIA IS-95A).

Radiotelephone communication system 100 includes fixed communication units commonly referred to a base transceiver stations (BTS) 101, 106, 105, and one or more mobile communication units although only one mobile communication unit 103 is shown. A coverage area served by base station 101 is commonly referred to as a cell coverage area 122. Likewise, cell coverage areas 124 and 126 are served by BTSs 105 and 106 respectively. Moreover, cell coverage areas 122, 124, and 126 may be defined by one, omni-directional, or more, sector, antennas.

BTSs 101, 105, and 106 include, among other things, a processor 140 and a memory 150. In addition, BTSs 101, 105, and 106 include a receiver for receiving coded communication signals from mobile station 103. Mobile station 103 includes a transceiver which transmits and receives coded communication signals to and from a source BTS, depicted as BTS 101 in FIG. 1. BTSs 101, 105, and 106 are coupled to a central base station controller (CBSC), 130, which includes, among other things, a processor 140 and a memory 150, and which is in turn coupled to a mobile switching center (MSC) 160, also including a processor 140 and a memory 160. In addition, MSC 160 is coupled to the public switched telephone network (PSTN) 162 using known techniques.

Radiotelephone, or wireless, communication between BTS 101 and mobile communication unit 103 occurs via radio frequency (RF) channels which provide physical paths over which digital communication signals such as voice and data are transmitted. Base-to-mobile station communications are said to occur on a down-link channel, or forward channel, while mobile-to-base station communications are said to occur on an up-link, or reverse channel. As shown, communication between mobile communication unit 103 occurs via a bi-directional communication signal 107. As mobile communication unit 103 travels away from a coverage area served by BTS 101, a handover of communication signal 107 from BTS 101 to a "target" BTS, must be accomplished. In wireless communication system 100, a handover is accomplished using a handover neighbor list which lists potential handover candidate BTSs. If the handover neighbor list is incorrect or incomplete, a call in progress may be dropped when the necessary connection cannot be established.

Figure 2:
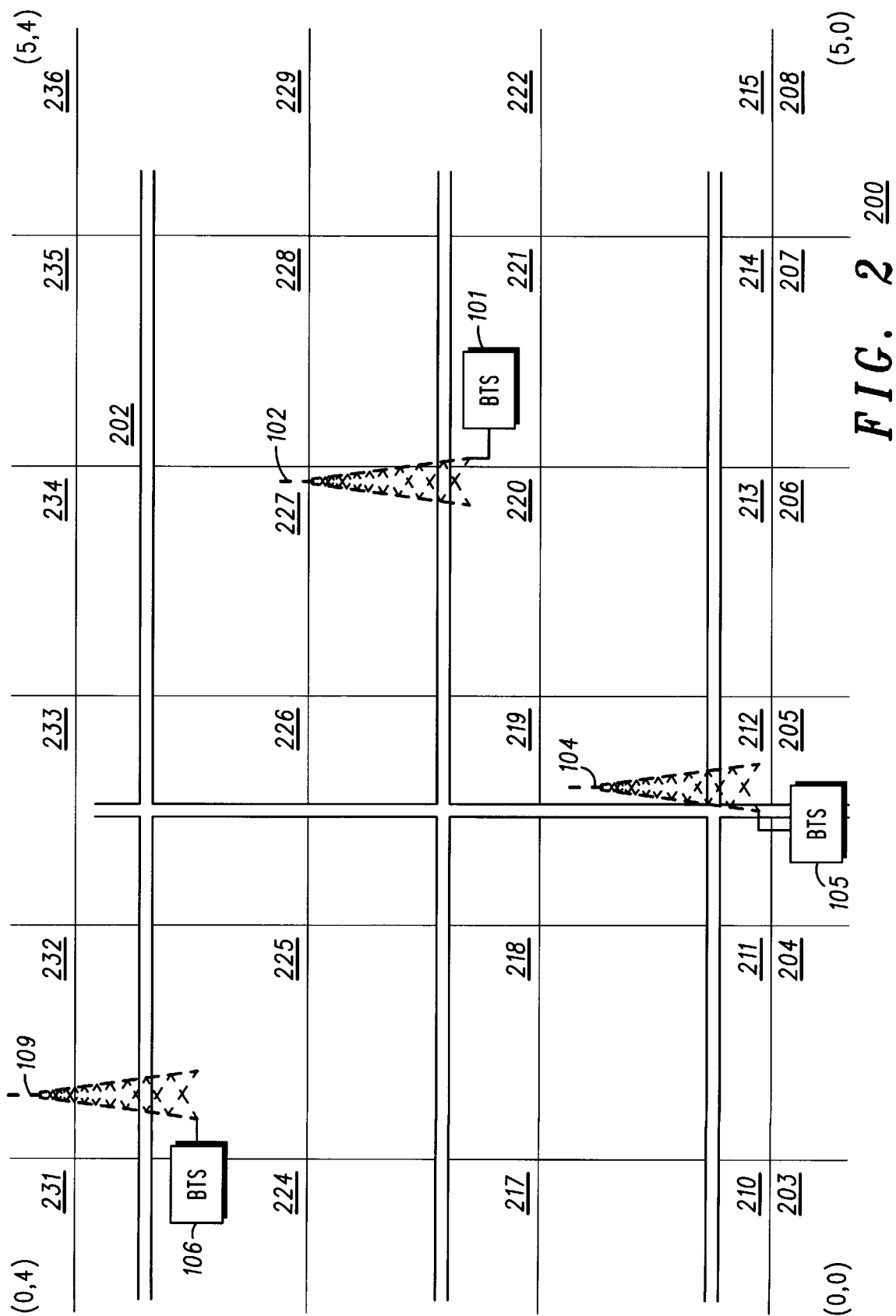
FIG. 2 is a partitioned diagram 200 of FIG. 1, overlaid with a grid pattern and associated vectors, according to a preferred embodiment of the present invention

FIG. 2 is a partitioned diagram 200 of FIG. 1, partitioned into a grid pattern and overlaid with a vector pattern 202, according to a preferred embodiment of the present invention. Partitioned diagram 200 shows an example by way of vector pattern 202, of the partitioning required to enable a simulation, or modeling, of radiotelephone communication system 100. Overlaying vector pattern 202 on radiotelephone communication system 100, provides reference points from which mobile communication signal interference data is gathered, and each handover neighbor list subsequently optimized. Although a digital radiotelephone communication system is shown, the preferred embodiment is equally applicable to an analog wireless communication system as well.

The radiotelephone service method for generating a handover neighbor list for managing mobile communication units served by BTSs such as BTS 105, is based on the use of a simulation apparatus. The simulation apparatus, herein referred to as a software simulation tool, utilizes various handover parameters as well as predefined routes and locations along which a mobile communication unit may travel, to select the best possible target BTSs for a handover of a mobile communication signal from a source BTS to a target BTS. First, the software simulation tool requires that radiotelephone communication system 100 be partitioned into a grid pattern defined by rectangular shaped "grid tiles". Each grid tile is then assigned a coordinate defined by the x and y direction. In addition, each grid tile is assigned a number of counters (discussed further below), the number of counters corresponding to the number of BTSs in radiotelephone communication system 100, or in a sub-area thereof.

For example, as shown in FIG. 2, radiotelephone communication system 100 is partitioned into a grid pattern comprised of grid tiles 203–236 corresponding to location coordinates (0,0) to (5,4). A grid tile 203 is representative of a location coordinate (0,0), while a grid tile 236 is representative of a location coordinate (5,4). For simulation purposes, BTS 105 is located in grid tile 205 at location coordinate (2,0). Similarly, BTS 101 is in grid tile 221 at location coordinate (4,2), and BTS 106 is in grid tile 224 at location coordinate (0,3). Although, as depicted, antennas 104, 102, and 109 are located in grid tiles 212, 227, and 232 respectively, simulation calculations are based on the grid tile locations of the BTSs.

Further, the software simulation tool requires that a vector pattern 202, including the vector endpoints of each vector (discussed in connection with FIG. 3), be overlaid on the grid pattern. Vector pattern 202 defines the possible paths which mobile communication unit 103 may travel while in coverage areas served by radiotelephone communication system 100. Both the location coordinates defined by the grid pattern and vector pattern 202, provide the necessary reference points from which mobile communication signal interference data is gathered for use by software algorithms according to embodiments of the present invention which generate the handover neighbor lists. In addition, the counters located in each grid tile provide a mechanism for tracking whether or not their corresponding BTSs receive a mobile communication signal from the location defined by the grid tile.

Figure 3:
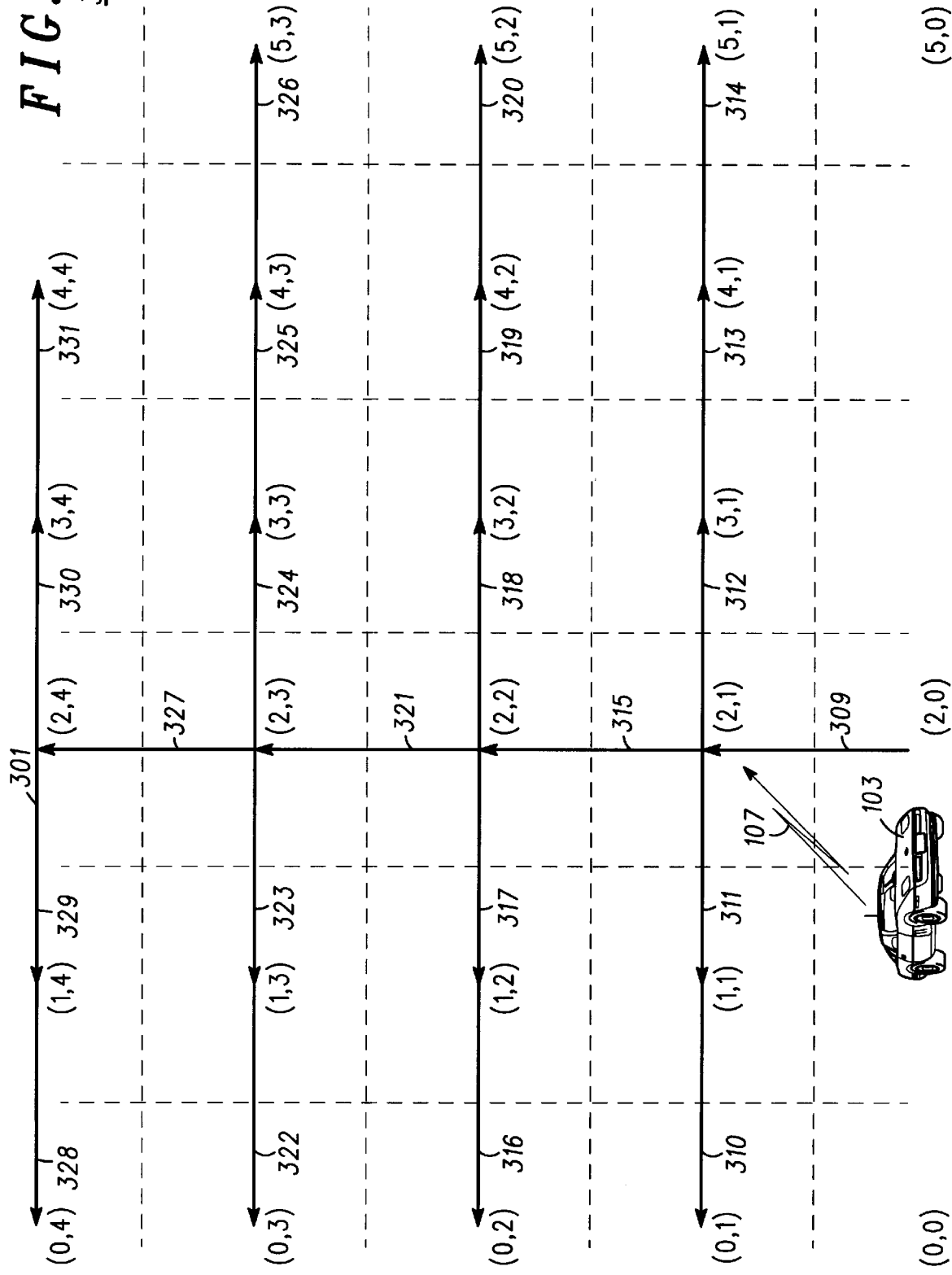
FIG. 3 is an example of a n-ary tree corresponding to the grid pattern and vector pattern depicted in FIG. 2, according to the preferred embodiment of the present invention.

Based on the grid pattern and vector pattern 202 of FIG. 2, a n-ary tree may be generated for use by the software simulation tool which collects the necessary mobile communication signal interference data. FIG. 3 is an example of a n-ary tree 301 corresponding to the grid pattern and vector pattern 202 depicted in FIG. 2, according to the preferred embodiment of the present invention.

N-ary tree 301 is comprised of vectors 309–331, representative of vector pattern 202. Each vector 309–331 includes a first and second endpoint, which may be referred to as a first and a second node and identified by a location coordinate. For example, vector 309 has a first node at location coordinate (2,0) and may be annotated as "vector 309 node (2,0)," and a second node at location coordinate (2,1) and is annotated as vector 309 node (2,1). Although in FIG. 3, the nodes associated with each vector are located in different grid tile locations, it is contemplated that vector pattern 301 may include nodes associated with each vector which originate and/or end in the same grid tile location.

The software simulation tool provides the necessary functionality to move a mobile communication unit along vectors 309–331. As previously discussed, each vector provides a path along which mobile communication unit 103 can travel. In addition, vectors 309–331 define intersection points at some of the nodes which allow a mobile communication unit to in travel multiple directions. If a vector node such as vector 309 node (2,1) defines connectivity to more than one other vector, for example vectors 312, 315, and 311, then mobile communication unit 103 arriving at vector 309 node (2,1) has more than one direction it can travel as it's movement continues.

The software simulation tool also manages the life cycle of a call and models the mobile communication signal, also referred to as a connection, between the mobile communication unit and it's source, or serving, BTS as well as it's neighboring BTSs as impacted by radiotelephone air-interface conditions at discrete points in time. At any point in time, there is some level of interference associated with a mobile communication signal such as mobile communication signal 107, which impacts the quality of the connection and/or the ability to make or sustain the connection. Thus in order for the software simulation tool to model radio links, it requires as input, BTS locations and their corresponding antenna coverage areas, transmit power information from each BTS, and signal path loss from each cell/sector coverage area with respect to specific locations defined by the grid tiles. Also required are minimum signal quality thresholds selected per cell/sector coverage areas. The minimum signal quality thresholds are subsequently applied when determining whether or not mobile communication signal 107 is sufficient, and therefore, whether or not to advance, by one, a counter associated with each neighboring BTS. The final counter counts are utilized by software algorithms tasked to generate the handover neighbor lists according to embodiments of the present invention.

For example, assigning BTS 105 as a source BTS, a first simulation run of mobile communication unit 103 begins at a first initial location. The first initial location is defined to be a location of the first selected source BTS, BTS 105 located in grid tile 205 in FIG. 2. Using n-ary tree 301 shown in FIG. 3, vector 309 node (2,0) is the logical starting point in grid tile 205 to begin attempts to make and sustain connections in order to collect corresponding signal quality metrics for use in the software algorithms. Signal quality metrics may include, for example, a signal strength indicator (SSI), a S/N ratio, a frame erasure rate (FER), a bit error rate (BER), or bit energy per noise density (Eb/No), and are indicative of a signal interference to mobile communication signal 107. Subsequent signal quality metrics for use in the software algorithms, executed to determine potential handover candidate BTSs, are collected at increasing travel distances from vector 309 node (2,0) as follows.

First, each time the mobile communication unit is placed in, or moved to a selected grid tile, an attempt to originate and sustain mobile communication signal 107 between mobile communication unit 103 and the source BTS, is made. Thus, this process begins at grid tile 205, vector 309 node (2,0). If mobile communication signal 107 to the source BTS is received at an acceptable signal quality, then a reference signal quality metric associated with the successful connection is collected. The reference signal quality metric is subsequently used to select a signal interference value threshold for use by a software algorithm in compiling the handover neighbor list. However, if mobile communication signal 107 is not received at an acceptable signal quality, then no further attempts will be made to originate and sustain mobile communication signal 107 with neighboring BTSs from the selected grid tile location. The lack of an ability to make successful connection between mobile communication unit 103 and its source BTS serves as an indicator that a required handover command could not be successfully communicated between the source BTS and mobile communication unit 103 from the location of the selected grid tile.

Next, if the connection between source BTS 105 and mobile communication unit 103 is successful, at vector 309 node (2,0), an attempt is made to originate and sustain a connection, shown as mobile communication signal 107 in FIG. 3. Mobile communication signal 107 is made between mobile communication unit 103, and a neighboring BTS such as BTS 101. If a minimum signal quality threshold is met or exceeded for mobile communication signal 107, then BTS 101 is considered a possible handover candidate. Thus, the connection between mobile communication unit 103 and BTS 101 exercises the radio link models of the software simulator and demonstrates the ability of neighboring BTS 101 to be a potential handover candidate. In other words, if mobile communication signal 107 is received by BTS 101 at an acceptable signal quality as compared with the minimum signal quality threshold, then a counter associated with BTS 101 which may or may not be located at tile 205 (see FIG. 2), increments by one. But, if mobile communication signal 107 is not received by BTS 101 at an acceptable signal quality, then the counter associated with BTS 101 and tile 205 does not increment. The counter counts and their associated signal quality metrics obtained for each of the potential handover candidate BTSs, and are subsequently used in a variety of software algorithms which compile a handover neighbor list for mobile communication unit 103 having BTS 105 as it's source BTS.

Upon completion of the counter count associated with BTS 101, an attempt is made from the initial location of vector 309 node (2,0), to originate and sustain mobile communication signal 107 with another neighboring BTS such as BTS 106. Again, if mobile communication signal 107 is received by BTS 106 at a minimum acceptable signal quality, a counter associated with BTS 106 which may or may not be located at tile 205 (see FIG. 2), increments by one. This process continues for all neighboring BTSs, and counter counts with associated signal quality metrics are collected for use by software algorithms in compiling handover neighbor lists.

Next, mobile communication unit 103 moves from the initial location defined at vector 309 node (2,0) to the next node, defined by vector 309 node (2,1) and located in grid tile 212. Again, after successfully completing the step to collect reference signal quality metrics for a connection made between mobile communication unit 103 and source BTS 105, an attempt is made to originate and sustain mobile communication signal 107 between mobile communication unit 103 and all neighboring BTS via selecting one potential neighboring BTS at a time, for example BTS 101 and then BTS 106. Counter counts and their associated signal quality metrics are noted and collected. For example, at vector 309 node (2,1) we may assume for illustrative purposes that mobile communication signal 107 is not received by BTS 101 at an acceptable signal quality due to terrain limitations. Therefore the counter associated with BTS 101 and grid tile 212 does not increment by one. But, if mobile communication signal 107 is received at an acceptable signal quality by BTS 106 and BTS 101 from vector 309 node (2,1) in grid tile 212, then the counters associated with BTSs 106 and 101 and grid tile 212, each increment by one.

Next, mobile communication unit 103 travels from vector 309 node (2,1) to the next node, which may be either vector 312 node (3,1), or vector 315 node (2,2), or vector 311 node (1,1). Again, an attempt is made to originate and sustain mobile communication signal 107 between mobile communication unit 103 and source BTS 105. If a successful connection is made between source BTS 105 and mobile communication unit 103, then an attempt is made to originate and sustain mobile communication signal 107 between mobile communication unit 103 and all neighboring BTS via selecting one neighboring BTS at a time, for example BTS 101 and then BTS 106. The first simulation run continues through each grid tile along vectors until mobile communication unit 103 has traveled some predefined distance, for example 2 times the radius of coverage area 122. Counter counts with their associated signal quality metrics are collected. In addition, the collected signal quality metrics for source BTS 105 as well as neighboring BTSs 101 and 106 are stored at each grid tile location, or node.

When all vectors from the first initial location, vector 309 node (2,0), to the furthest vector location are traveled, the first simulation run is complete. Each node/tile is processed once for BTS 105 as the source BTS, in order to yield the required signal quality metrics resulting from the connections between mobile communication unit 103 and neighboring BTSs.

After completing the first simulation run using BTS 105 as the source BTS, a second simulation run is initiated wherein another BTS such as BTS 101 is selected to be the source BTS. All neighboring BTSs are deemed to be potential handover candidates, and the process is repeated. For example, if BTS 101 is selected to be the source BTS, a second simulation run of mobile communication unit 103 begins at a second initial location defined as the location of BTS 101, shown in FIG. 2 as grid tile 221. Neighboring BTSs 105 and 106 become the potential handover candidates.

The second simulation run begins at vector 319 with an attempt to originate and sustain mobile communication signal 107 with the source BTS, BTS 101. If mobile communication signal 107 is received at an acceptable signal quality, then the reference signal metric associated with the successful connection is collected for use in compiling the handover neighbor list. However, if mobile communication signal 107 is not received at an acceptable signal quality, then no further attempts will be made to originate and sustain mobile communication signal 107 with potential neighboring BTSs from the selected grid tile location.

If a successful connection is made between mobile communication unit 103 and BTS 101, at vector 319 node (4,2), then a subsequent attempt is made to originate and sustain mobile communication signal 107 between mobile communication unit 103, and a neighboring BTS such as BTS 106. If a minimum signal quality threshold is met or exceeded, then BTS 106 is considered a possible handover candidate and the counter associated with BTS 106 and tile 221 increments by one. If communication signal 107 is not received by BTS 101 at an acceptable signal strength, then the counter associated with BTS 106 and tile 221 does not increment.

Upon completion of the attempt to originate and sustain a communication signal 107 to BTS 106, an attempt is made to originate and sustain mobile communication signal 107 to another neighboring BTS such as BTS 105. Again, if mobile communication signal 107 is received by BTS 105 at a minimum acceptable signal quality, the counter associated with BTS 105 and tile 221 (see FIG. 2) accumulates a peg count of one. This process continues from the second initial location for all neighboring BTSs, resulting in counter counts used for subsequent compilation of a handover neighbor list for mobile communication unit 103 having BTS 101 as it's source BTS.

Next, mobile communication unit 103 travels from the second initial location defined at vector 319 node (4,2) to a location defined by vector 319 node (3,2). Again, an attempt is made to originate and sustain mobile communication signal 107 with the source BTS, source BTS 101. If a successful connection is made with BTS 101, then mobile communication unit 103 subsequently attempts to originate and sustain connections with all neighboring BTS such as BTS 106 and 105. Counter counts with associated signal quality metrics for the second simulation run are noted and collected as before.

The final simulation run is completed when each BTS, having been assigned the role of a source BTS, has a it's full complement of counter counts and associated signal quality metrics. Using the resulting counts and associated signal quality metrics, handover neighbor lists are generated using one of three algorithms, although additional algorithms for compiling a handover neighbor are possible, such as the combination of steps from each algorithm.

Figure 4:
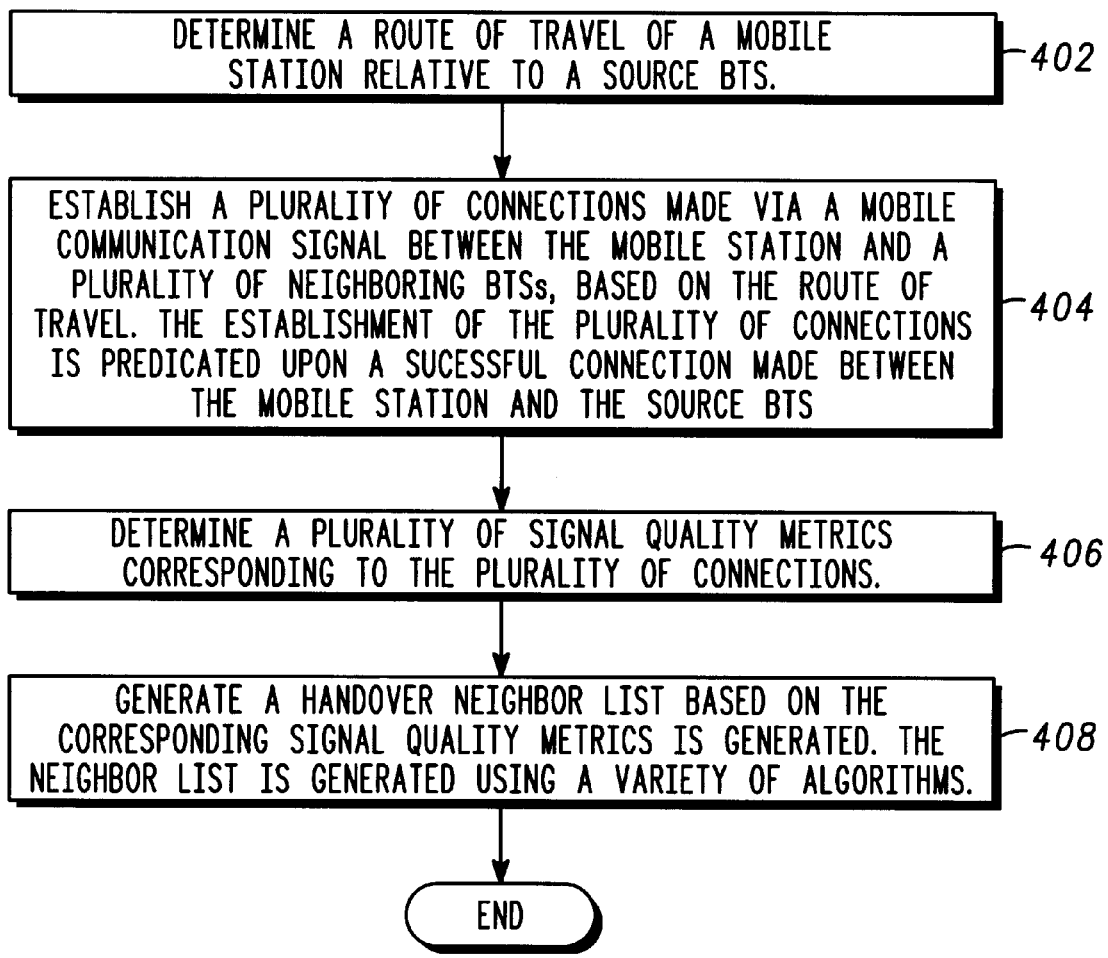
FIG. 4 is a flow chart representing a method 400 for service planning in a radiotelephone system according to the preferred embodiment of the present invention.

In FIG. 4, a flow chart representing a method, generally designated 400 for service planning in a radiotelephone system, is shown. Method 400 begins at step 402 where a route of travel of a mobile station relative to a source BTS, is determined. Next at step 404, a plurality of connections made via a mobile communication signal, are established between the mobile station and a plurality of neighboring BTSs, based on the route of travel. The establishment of the plurality of connections is predicated upon a successful connection made between the mobile station and the source BTS. A plurality of signal quality metrics corresponding to the plurality of connections are determined, at step 406. Finally, at step 408, a handover neighbor list based on the corresponding signal quality metrics is generated. The neighbor list is generated using a variety of algorithms.

The first algorithm which may be used to generate a handover neighbor list for use by mobile communication unit 103 as it moves from one BTS coverage area to another, is based upon a comparison of a signal interference value threshold and the signal quality metrics associated with each connection collected at increasing travel distance from the grid tile location associated with the source BTS. The signal interference value threshold represents a delta difference, or margin, for comparing the signal quality metrics at a specific grid tile location collected for the source BTS with signal quality metrics collected for each of the neighboring BTSs. In other words, the difference between the reference signal quality metrics and the measured signal quality metrics, is ascertained. The signal interference value threshold may be measured in units of dB or error rates, depending on which type of signal quality metrics are defined and collected. The signal quality metrics defined to reflect signal interference values, are collected and stored for each connection made between mobile communication unit 103, and its source and neighboring BTSs. The signal quality metrics are compared using the signal interference value threshold. The signal interference value threshold is selected relative to the reference signal quality metrics collected and stored for each successful connection between mobile communication unit 103 and it's source BTS, as mobile communication unit 103 moved through each grid tile location. If a connection made between mobile communication unit 103 located at a specific grid tile and a neighboring BTS, meets or exceeds the signal interference value threshold, then that neighboring BTS is added to the handover neighbor list. The handover neighbor list is subsequently provided to mobile communication unit 103 when it is traveling in the area of the a specific grid tile.

Further, the signal interference value threshold is a derivative of whatever signal quality metric is used, and is selected for a comparison which determines whether or not the connection between mobile communication unit 103 and a neighbor BTS would be more favorable than the connection between mobile communication unit 103 and the source BTS, at the current grid tile location. Thus, the signal interference value threshold is expressed in units of dB or error rate, depending on the signal quality metric used for the comparison.

In other words, the first algorithm selects neighboring BTSs for inclusion in a handover neighbor list based on an evaluation of signal quality metrics collected at increasing distances radiating outward from a selected source BTS. Determining that a neighboring BTS is a handover candidate is accomplished by evaluating each neighboring BTS via the signal interference value threshold established via the first algorithm.

For example, a handover neighbor list for use by mobile communication unit 103 having BTS 105 located at grid tile 205 as its source BTS, begins with application of the signal interference value threshold to connections made from a location defined by vector 309 node (2,0) to neighboring BTSs. Thus, if BTS 101 is being evaluated as a neighboring BTS and SSI is chosen to be the signal quality metric, then a signal interference value threshold, expressed in units of dB, is applied to the reference SSI signal quality metric. In this example, if the resulting SSI signal quality metric, collected via the connection to BTS 101 has a value which exceeds the reference SSI quality metric of BTS 101 by the signal interference value threshold, then BTS 101 is added to the neighbor list.

Next, using vector 309 as the vector that provides travel routes away from BTS 105, mobile communication unit 103 travels to the next grid tile, defined as grid tile 212 which includes vector 309 node (2,1). Again, application of the signal interference value threshold is used to evaluate connections made between mobile communication unit 103 and neighboring BTSs. Because vector 309 node (2,1) represents an intersection point, mobile communication unit 103 is allowed to continue travel along vectors 311, 312, and 315. Moving along these vectors, mobile communication unit 103 encounters grid tiles 211, 213, and 219 respectively. In each of these grid tiles, application of the signal interference value threshold is used to evaluate connections made between mobile communication unit 103 and remaining neighboring BTSs for inclusion on the handover neighbor list. Mobile communication unit 103 continues traveling outward from BTS 105 in a pattern defined by n-ary tree 301, while application of the signal interference value threshold is used to generate a handover neighbor list, generation of the handover neighbor list stopping when the maximum handover neighbor list size is reached.

The second algorithm which may be used to generate a handover neighbor list for use by mobile communication unit 103 as it moves from one BTS coverage area to another, is based upon the results of counters associated with corresponding BTSs. The counters initiate a count algorithm upon the attempting the first connection between mobile communication unit 103 located at the first initial location. Each BTS has an associated counter at each grid tile location. The counters are increment by one each time a successful connection is made between mobile communication unit 103 and one of the one of the plurality BTSs. The counters are not incremented for unsuccessful connections. Upon completion of all simulation runs, each counter is assessed a total count representative of the number of times its corresponding BTS made a successful connection with mobile communication unit 103. A set of BTSs having the highest total counts is selected as the handover neighbor list for use by mobile communication unit 103 when it is traveling in the area which yielded the highest associated total counts.

The third algorithm which may be used to generate a handover neighbor list for use by mobile communication unit 103 as it moves from one BTS coverage area to another, is also based upon the results of counters associated with corresponding BTSs. The counters initiate a count algorithm upon attempting the first connection between mobile communication unit 103 located at the first initial location. Each BTS has an associated counter at each grid tile location. The counters are incremented by one each time a successful connection is made between mobile communication unit 103 and one of the one of the plurality BTSs. The counters are not incremented for unsuccessful connections. The third algorithm selects an N set of neighboring BTSs which are first to establish successful connections with mobile communication unit 103, and consequently increment their associated counters, for compilation of the handover neighbor list.

In other words, upon completion of all simulation runs, the neighboring BTSs associated with counters which were first to increment by one, starting from the beginning of each simulation, are selected for the handover neighbor lists. A variety of criteria may be used to determine how many BTSs having the first successful connections, may be used. The simulations performed for application of the third, or "first pass" algorithm, may be repeated under various load conditions in order to further prune or enhance the handover neighbor list. This approach will provide handover coverage for the substantial majority of situations which may possibly be encountered in a radiotelephone system. In addition, this approach allows for interference variables to be considered, thus eliminating marginal neighboring BTSs from being added to the handover neighbor list. Moreover, simulations may be performed using a variety of traffic channels assigned to a source BTS, again, to eliminate marginal neighboring BTSs, or to identify frequency planning problems that may impact selection of neighboring BTSs for the handover neighbor list and subsequent call quality.

The IS-95A forward link channel and mobile communication unit and its application in wireless CDMA systems has been specifically referred to herein, but the present invention is applicable to any radiotelephone wireless communication system, including but not limited to the reverse link IS-95A channel, all wideband forward and reverse link channels and to all forward- and reverse-link TDMA channels, in all TDMA systems such as Groupe Special Mobile (GSM), a European TDMA system, Pacific Digital Cellular (PDC), a Japanese TDMA system, Interim Standard 54 (IS-54), a U.S. TDMA system, and analog wireless communication systems.

The principles of the present invention which apply to a cellular-based digital communication system also apply to other types of communication systems, including but not limited to personal communication systems, trunked systems, satellite systems and data networks. Likewise, the principles of the present invention which apply to all types of digital radio frequency channels also apply to other types of communication channels, such as electronic data buses, wireline channels, optical fiber links and satellite links.

What we claim is:

1. In a radiotelephone communication system, comprising a first fixed communication unit, a plurality of other fixed communication units, and a mobile communication unit responsive to at least the first fixed communication unit, a radio telephone service planning method comprising the steps of:

determining a route of travel of the mobile communication unit relative to the first fixed communication unit;

establishing a plurality of connections between the mobile communication unit and the plurality of other fixed communication units, based on the route of travel of the mobile communication unit;

determining a plurality of signal quality metrics corresponding to the plurality of connections; and generating a handover neighbor list based on the corresponding signal quality metrics;

wherein determining the route of travel comprises the steps of:

partitioning a coverage area associated with the radiotelephone communication system to be analyzed into a grid pattern, the grid pattern comprised of grid tiles; and overlaying a vector pattern on the grid pattern, the vector pattern based on likely routes of travel by the mobile communication unit;

wherein establishing the vector pattern comprises the steps of:

identifying first initial location substantially proximate to the first fixed communication unit;

forming a first vector between the first initial location and a second location from the first fixed communication unit; and forming at least another vector between the second location and a plurality of other locations from the first fixed communication unit;

wherein the step of establishing a plurality of connections between the mobile communication unit and the plurality of other fixed communication units comprises the steps of:

selecting the first initial location from which the plurality of connections can be made;

originating a mobile communication signal between the mobile communication unit located at the first initial location and the first fixed communication unit, the mobile communication signal representative of a first connection;

obtaining a plurality of signal quality metrics corresponding to the first connection made between the mobile communication unit at the first initial location, and the first fixed communication unit;

selecting one target location at a time, the target location corresponding to a location of one of the plurality of other fixed communication units;

originating a mobile communication signal between the mobile communication unit located at the first initial location and the one of the plurality of other fixed communication units located at the target locations;

obtaining a plurality of signal quality metrics corresponding to the plurality of connections made between the mobile communication unit at the first initial location, and the plurality of other fixed communication units;

selecting a next location from which the plurality of connections can be made;

originating a mobile communication signal between the mobile communication unit located at the next location and the first fixed communication unit;

obtaining a plurality of signal quality metrics corresponding to the mobile communication signal originated between the mobile communication unit at the next location, and the first fixed communication unit;

originating a communication signal between the mobile communication unit located at the next location and the one of the plurality of other fixed communication units located at the target locations, the next location based on the route of travel of the mobile communication unit; and obtaining a plurality of signal quality metrics corresponding to the plurality of connections between the mobile communication unit at the next location, and the plurality of other fixed communication units.

2. The method according to claim 1, wherein establishing the vector pattern further comprises the steps of:

identifying a first intersection point at the second location, the first intersection point allowing alternate routes of travel for the mobile communication unit from the second location.

3. The method according to claim 1, wherein the signal quality metrics are selected from a group consisting essentially of a signal strength indicator (SSI), a S/N ratio, a frame erasure rate (FER), a bit error rate (BER), and a bit energy per noise density (Eb/No).

4. The method according to claim 1, wherein determining the plurality of signal quality metrics comprises the step of:

obtaining a plurality of interference values corresponding to the plurality of connections between the mobile communication unit and the plurality of other fixed communication units.

5. The method according to claim 4, wherein the interference values are uplink interference values.

6. The method according to claim 4, wherein the interference values are downlink interference values.

7. The method according to claim 4, wherein expression of the interference values are selected from a group consisting essentially of a dB unit, and an error rate unit.

8. The method according to claim 4, wherein generating handover the neighbor list comprises the steps of:

storing the plurality of interference values corresponding to the plurality of connections;

determining a signal interference value threshold representative of whether each of the plurality of connections can be maintained between the mobile communication unit and the plurality of other fixed communication units, the signal interference value threshold based on the signal quality metrics obtained by measuring the mobile communication signal between the mobile communication unit and the first fixed communication unit; and selecting a set of the plurality of other fixed communication units based on the signal interference value threshold, to form a handover neighbor list for use by the mobile communication unit.

9. The method according to claim 4, wherein generating the handover neighbor list further comprises the steps of:

initiating a count algorithm in a plurality of counters upon establishing a first connection between the mobile communication unit located at the first initial location, and one of the plurality of other fixed communication units, the plurality of counters corresponding to the plurality of other fixed communication units;

incrementing by one, the one of the plurality of counters, when a successful connection is made between the fixed communication unit associated with the one of the plurality of counters and the mobile communication unit;

not incrementing by one, the one of the plurality of counters, when a successful connection is not made between the fixed communication unit associated with the one of the plurality of counters and the mobile communication unit; and selecting a set of at least one of the plurality of other fixed communication units in which the one of the plurality of counters was incremented, the set of at least one of the plurality of other fixed communication units forming a handover neighbor list for use by the mobile communication unit.

10. The method according to claim 9, wherein the step of selecting is based upon choosing the at least one of the plurality of other fixed communication units in which the one of the plurality of counters was first to be incremented after initiating the count algorithm.

11. The method according to claim 4, wherein generating the neighbor list further comprises the steps of:

initiating a count algorithm in a plurality of counters upon establishing a first connection between the mobile communication unit located at the first initial location, and one of the plurality of other fixed communication units, the plurality of counters corresponding to the plurality of other fixed communication units;

incrementing by one, the one of the plurality of counters, when a successful connection is made between the fixed communication unit associated with the one of the plurality of counters and the mobile communication unit;

not incrementing by one, the one of the plurality of counters, when a successful connection is not made between the fixed communication unit associated with the one of the plurality of counters and the mobile communication unit;

establishing a total count for a number of times each of the plurality of counters corresponding to the plurality of other fixed communication units is incremented by one; and selecting a set of the plurality of other fixed communication units based on the total count, the set of the plurality of other fixed communication units forming a handover neighbor list for use by the mobile communication unit.

* * * * *